United States Patent
Sung et al.

(10) Patent No.: US 7,246,313 B2
(45) Date of Patent: Jul. 17, 2007

(54) APPARATUS AND METHOD FOR AUTHORING MULTIMEDIA DOCUMENT

(75) Inventors: Hyun-ah Sung, Seoul (KR); Dae-gyu Bae, Suwon-si (KR); Jin-woo Hong, Seoul (KR); Ju-han Lee, Suwon-si (KR)

(73) Assignee: Samsung Electronics Corporation, Suwon, Kyungki-do (KR)

( * ) Notice: Subject to any disclaimer, the term of this patent is extended or adjusted under 35 U.S.C. 154(b) by 435 days.

(21) Appl. No.: 10/629,872

(22) Filed: Jul. 30, 2003

(65) Prior Publication Data

US 2004/0107401 A1    Jun. 3, 2004

(30) Foreign Application Priority Data

Dec. 2, 2002    (KR)    ............... 10-2002-0076031

(51) Int. Cl.
*G06F 15/00* (2006.01)
(52) U.S. Cl. .................... 715/530; 715/500.1
(58) Field of Classification Search ............ 715/501.1, 715/513, 500, 500.1, 507, 508, 530
See application file for complete search history.

(56) References Cited

U.S. PATENT DOCUMENTS

| | | | |
|---|---|---|---|
| 6,137,483 A * | 10/2000 | Kiyono et al. ............ | 715/500.1 |
| 6,230,173 B1 * | 5/2001 | Ferrel et al. ................ | 715/513 |
| 6,374,271 B1 * | 4/2002 | Shimizu et al. ........... | 715/501.1 |
| 6,449,640 B1 * | 9/2002 | Haverstock et al. ....... | 709/219 |
| 6,462,754 B1 * | 10/2002 | Chakraborty et al. ...... | 715/723 |
| 6,487,599 B1 * | 11/2002 | Smith et al. ................ | 709/229 |
| 6,490,601 B1 * | 12/2002 | Markus et al. ............. | 715/507 |
| 6,850,808 B2 * | 2/2005 | Yuen et al. .................. | 700/86 |
| 6,854,085 B1 * | 2/2005 | Morse ........................ | 715/507 |
| 6,911,992 B2 * | 6/2005 | Bronstein et al. .......... | 345/629 |
| 6,938,203 B1 * | 8/2005 | Dimarco et al. ............ | 715/513 |
| 7,020,681 B1 * | 3/2006 | Ayyagari et al. ........... | 709/203 |

(Continued)

FOREIGN PATENT DOCUMENTS

KR    2002-0072969 A    9/2002

OTHER PUBLICATIONS

Celentano et al., Schema Modelling for Automatic Generation of Multimedia Presentations, ACM 2002, pp. 593-600.*

(Continued)

*Primary Examiner*—Cong-Lac Huynh
(74) *Attorney, Agent, or Firm*—Sughrue Mion, PLLC (57) ABSTRACT

An apparatus and method for authoring multimedia documents are provided. The apparatus includes a template document floating field detector for detecting a floating field of a template document, which is an incomplete multimedia document having a fixed field and the floating field, by parsing a control document including information identifying the floating field and a list of selectable objects; a control document provider for rendering and outputting the control document; a user selection information receiving unit for receiving information selected by a user with respect to the control document output from the control document provider; and a multimedia document finisher for completing the template document as a multimedia document by fixing the detected floating field to be an object designated by the information selected by the user among the list of selectable objects, when the information selected by the user is received.

30 Claims, 7 Drawing Sheets

U.S. PATENT DOCUMENTS

| | | | |
|---|---|---|---|
| 7,171,615 B2* | 1/2007 | Jensen et al. | 715/506 |
| 2001/0014910 A1* | 8/2001 | Bobo, II | 709/206 |
| 2001/0051962 A1* | 12/2001 | Plotkin | 707/522 |
| 2002/0019833 A1* | 2/2002 | Hanamoto | 707/500 |
| 2002/0087530 A1* | 7/2002 | Smith et al. | 707/3 |
| 2002/0137507 A1* | 9/2002 | Winkler | 455/426 |
| 2002/0161589 A1* | 10/2002 | Strandberg | 705/1 |
| 2002/0161603 A1* | 10/2002 | Gonzales | 705/1 |
| 2002/0169796 A1* | 11/2002 | Schwartz | 707/500.1 |
| 2003/0188262 A1* | 10/2003 | Maxwell et al. | 715/507 |
| 2003/0210428 A1* | 11/2003 | Bevlin et al. | 358/1.18 |
| 2003/0233614 A1* | 12/2003 | Mohamed | 715/501.1 |
| 2004/0054659 A1* | 3/2004 | McIntyre | 707/3 |
| 2004/0075669 A1* | 4/2004 | Bronstein et al. | 345/619 |
| 2004/0075866 A1* | 4/2004 | Thormodsen et al. | 358/1.18 |
| 2004/0268224 A1* | 12/2004 | Balkus et al. | 715/500.1 |
| 2004/0268229 A1* | 12/2004 | Paoli et al. | 715/508 |
| 2005/0149854 A1* | 7/2005 | Pennell et al. | 715/507 |
| 2005/0196074 A1* | 9/2005 | Deere | 382/305 |

OTHER PUBLICATIONS

W3C, Accessibility Features of SMIL, Google Sep. 21, 1999, pp. 1-24.*

Fraisse et al., Generating Hypermedia from Specifications by Sketching Multimedia Templates, ACM 1996, pp. 353-363.*

* cited by examiner

```
<smil>
  <head>
    <meta name="controlFile" content="control_mms.ctr"/>
  </head>
  <body>
    <par id="container1" dur="60s">
      <img id="img1" src="a.jpg"/>
      <audio id="audio1" src="z.wav"/>
    </par>
  </body>
</smil>
```

```
<smilControl src="mms.smil" type="file">
  <change id="img1" attr="src" option="a.jpg;b.jbp;userChoice">
    <question> select an image file that you wish to change. </question>
  </change>
  <change id="container1" attr="dur" option="30s;60s;90s">
    <question> for how many seconds should it play? </question>
  </change>
</smilControl>
```

FIG. 4

```
<smilControl type="inline">
  <change id="img1" attr="src" option="a.jpg;b.jbp;userChoice">
    <question> select an image file that you wish to change.
    </question>
  </change>
  <change id="container1 attr="dur" option="30s;60s'90s">
    <question> for how many seconds should it play?
    </question>
  </change>
  <smil>
    <body>
      <par id="container1" dur="60s">
        <img id="img1" src="a.jpg"/>
        <audio id="audio1" src="z.wav"/>
      </par>
    </body>
  </smil>
</smilControl>
```

```
<smil>
    <head>
        <layout>
            <root-layout width="200" height="150"/>
            <region id="r1" left="10" top="10" width="180" height="130" backgroundColor="green" />
        </layout>
        <meta name="controlFile" content="control_mms.ctr"/>
    </head>
    <body>
        <par id="container1" dur="60s">
            <img id="img1" region="r1" src="HappyBirthDay1.jpg" />
            <audio id="audio1" src="Congratulation.wav" />
        </par>
    </body>
</smil>

<smilControl src="mms.smil" type="file">
    <change id="img1" attr="src" option="HappyBirthDay1.jpg;HappyBirthDay2.jpg;userChoice">
        <question> select an image file that you wish to change.
        </question>
    </change>
    <change id="container1" attr="dur" option="30s;60;90s">
        <question> for how many seconds should it play?
        </question>
    </change>
</smilControl>
```

APPARATUS AND METHOD FOR AUTHORING MULTIMEDIA DOCUMENT

BACKGROUND OF THE INVENTION

This application claims the priority of Korean Patent Application No. 10-2002-0076031, filed on Dec. 2, 2002, in the Korean Intellectual Property Office, the disclosure of which is incorporated herein in its entirety by reference.

1. Field of the Invention

The present invention relates to an apparatus and method for authoring multimedia documents.

2. Description of the Related Art

Telecommunication service providers have recently introduced multimedia data communication services so that subscribers can transmit and receive multimedia data. That is, while only short messages, monotone phone rings, or symbolized characters could have been transmitted up to now, it is now possible to transmit multimedia data, such as images including still images captured by a built-in camera of a mobile phone, music files, or video clips, due to the development of high-speed data processing technologies in wireless networks, such as the EVDO (EVolution Data Only) technology for transmitting data at high rates of 600 to 700 Kbps and color display technologies in mobile phones. Such a multimedia data communication service for transmitting and receiving multimedia data, such as graphic or still images, video clips, audio files, etc., through mobile phones is called a multimedia messaging service (MMS).

The 3GPP ($3^{rd}$ Generation Partnership Project), an international convention for the next generation wireless telecommunication protocols, has agreed to use SMIL (Synchronized Multimedia Integration Language) in multimedia messaging services and streaming services. Accordingly, in future multimedia messaging services, SMIL-based multimedia contents will be transmitted through personal telecommunication terminals, such as mobile phones or PDA's. SMIL is a standard, developed by the World Wide Web Consortium (W3C), for receiving and synchronizing multimedia data through the Internet. Each multimedia object in an SMIL document has a unique URL (uniform resource locator) and can be accessed using the unique URL. Accordingly, a plurality of multimedia objects received from a plurality of different locations can be included in an SMIL document. The multimedia streaming standard for exchanging packets, recommended by the 3GPP, adopts the SMIL 2.0 Basic Profile, plus some additional functions as standard display technologies.

There are several SMIL authoring tools or editors, such as GriNS™ commercialized by Oratrix Development and GoLive6™ commercialized by Adobe Systems, Incorporated. However, most of the SMIL editors commercialized at this time can only be used in personal computer (PC) environments and the impossibility of editing SMIL documents in mobile phone environments exists. Considering the features of multimedia messaging services, it is desirable for SMIL documents to be instantly constructed or edited and transmitted in mobile phone environments. However, conventional methods of transmitting SMIL documents, i.e., multimedia data, have included undesirable steps of producing or editing SMIL documents in a PC and downloading the edited SMIL documents from the PC to a mobile phone. Further, since the existing SMIL editors are not user-friendly, editing SMIL multimedia messages using the existing SMIL editors is cumbersome for ordinary mobile phone users who do not have a sufficient knowledge of SMIL and the authoring or editing techniques thereof.

SUMMARY OF THE INVENTION

The present invention provides an apparatus and method for authoring multimedia documents, particularly SMIL documents, by which ordinary users can simply and conveniently produce or edit multimedia documents without an in-depth knowledge of SMIL and the authoring or editing techniques thereof.

According to an exemplary aspect of the present invention, there is provided an apparatus for authoring multimedia documents, which includes a template document floating field detecting unit for detecting a floating field of a template document, which is an incomplete multimedia document having a fixed field and the floating field, by parsing a control document including information identifying the floating field and a list of selectable objects; a control document outputting unit for rendering and outputting the control document; a user selection information receiving unit for receiving information selected by a user with respect to the control document output from the control document outputting unit; and a multimedia document completing unit for completing the template document as a multimedia document by fixing the floating field detected by the template document floating field detecting unit to be an object designated by the information selected by the user among the list of selectable objects, when the information selected by the user is received through the user selection information receiving unit.

According to another exemplary aspect of the present invention, there is provided an apparatus for authoring multimedia messages, which includes a template document floating field detecting unit for detecting a floating field of a template document, which is an incomplete multimedia document having a fixed field and the floating field, by parsing a control document including information identifying the floating field and a list of selectable objects; a control document outputting unit for rendering and outputting the control document; a user selection information receiving unit for receiving information selected by a user with respect to the control document output from the control document outputting unit; a multimedia message completing unit for completing the template document as a multimedia message by fixing the floating field detected by the template document floating field detecting unit to be an object designated by the information selected by the user among the list of selectable objects, when the information selected by the user is received through the user selection information receiving unit; a multimedia message outputting unit for rendering and outputting the multimedia message completed by the multimedia message completing unit when a preview function is selected by the user; and a multimedia message transmitting unit for transmitting the output multimedia message to a terminal having a reception number, when the user selects the multimedia message output from the multimedia message outputting unit and inputs the reception number.

According to another exemplary aspect of the present invention, there is provided a method of authoring multimedia documents including the steps of (a) detecting a floating field of a template document, which is an incomplete multimedia document having a fixed field and the floating field, by parsing a control document including information identifying the floating field and a list of selectable objects; (b) rendering and outputting the control document; (c) receiving information selected by a user with respect to the output control document; and (d) completing the template document as a multimedia document by fixing the detected floating field to be an object designated by the information selected by the user among the list of selectable objects, when the information selected by the user is received in step (c).

According to another exemplary aspect of the present invention, there is provided a method of authoring multimedia messages including the steps of (a) detecting a floating field of a template document, which is an incomplete multimedia document having a fixed field and the floating field, by parsing a control document including information identifying the floating field and a list of selectable objects; (b) rendering and outputting the control document; (c) receiving information selected by a user with respect to the output control document; (d) completing the template document as a multimedia message by fixing the detected floating field to be an object designated by the information selected by the user among the list of selectable objects, when the information selected by the user is received in step (c); (e) rendering and outputting the completed multimedia message when a preview function is selected by the user; and (f) transmitting the output multimedia message to a terminal having a reception number when the user selects the output multimedia message and inputs the reception number.

BRIEF DESCRIPTION OF THE DRAWINGS

The above and other aspects and advantages of the present invention will become more apparent by describing in detail illustrative, non-limiting embodiments thereof with reference to the attached drawings in which.

DETAILED DESCRIPTION OF THE INVENTION

Illustrative, non-limiting embodiments of the present invention will now be described with reference to the attached drawings.

Figure 1:
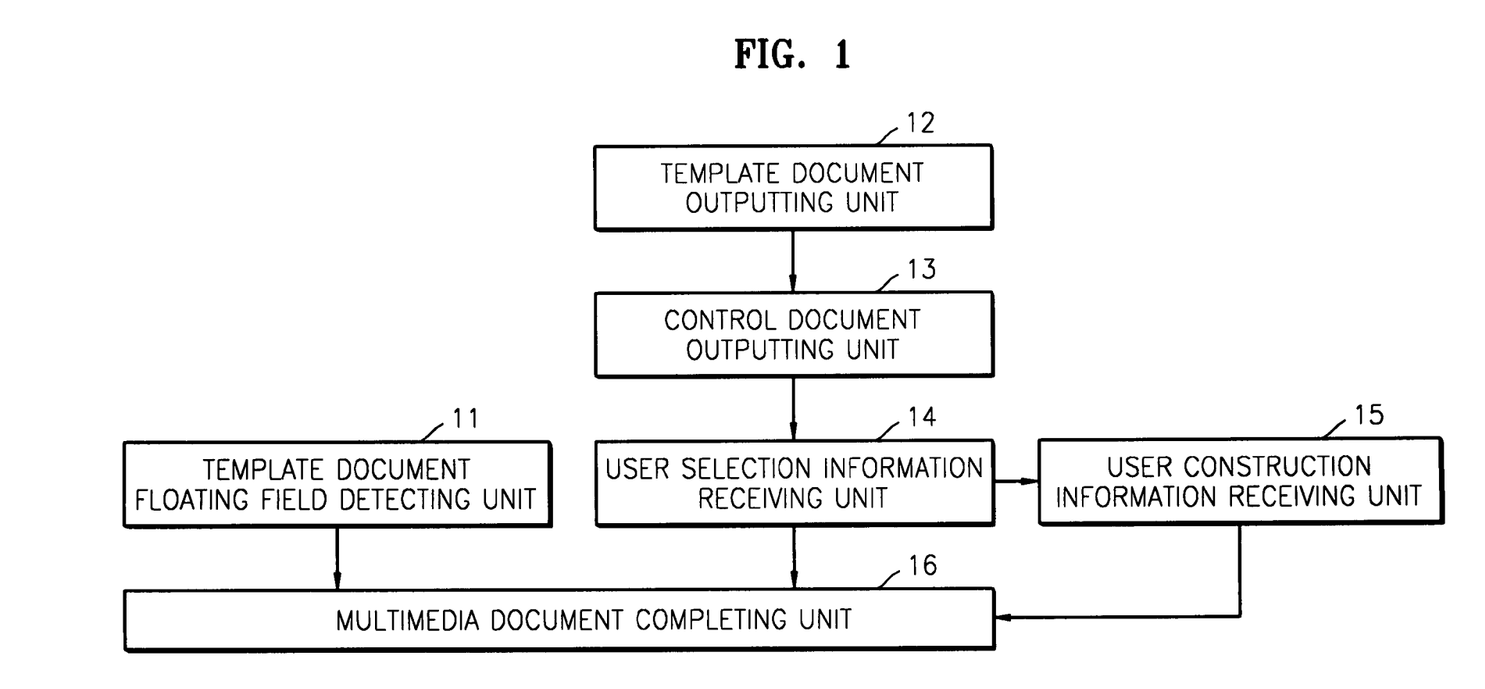
FIG. 1 is a block diagram of an apparatus for authoring multimedia documents according to the present invention.

FIG. 1 is a block diagram of an apparatus for authoring multimedia documents according to the present invention. Referring to FIG. 1, the multimedia document authoring apparatus according to the present invention includes a template document floating field detecting unit 11, a template document outputting unit 12, a control document outputting unit 13, a user selection information receiving unit 14, a user construction information receiving unit 15, and a multimedia document completing unit 16.

The template document floating field detecting unit 11 detects a floating field of a template document, which is an incomplete multimedia document having a fixed field and the floating field, by parsing a control document including information identifying the floating field and a list of selectable objects. Here, the fixed field, which includes information on a document structure and a multimedia file, cannot be selected by the user, and the floating field, which includes information on a multimedia file, can be selected by the user. Usually, a template document is a document where a basic frame frequently used in a certain format of documents is previously constructed. The fixed field is the basic frame and a user cannot change the fixed field. The fixed field may include information on a general structure of a document and a logo or banner image inserted beforehand by a contents provider providing the template document. The floating field is contained in the basic frame, i.e., the fixed field, and a user can freely change the floating field. The floating field may include multimedia files, such as video, audio, and image files, and attribute values of an SMIL document, such as locations, sizes, and reproduction time periods of the multimedia files.

If the template document is constructed in SMIL (Synchronized Multimedia Integration Language), the document structure includes predetermined elements and predetermined attributes of the predetermined elements, and the multimedia file information would include identification codes of the predetermined elements and values of the predetermined attributes. That is, if media elements and attributes thereof are determined in a template document, a user can freely edit an SMIL document by changing the names or attribute values of the media files designated by the media elements of the template document.

If the control document is constructed in XML (Extensible Markup Language), the information for detecting the floating field includes the identification codes of the elements, and the list of selectable objects is comprised of a list of values of predetermined attributes of the elements. For example, if it is determined to play an audio file in an SMIL document provided as a template, an identification code of the audio file and a list of selectable default audio files are included in the control document. If a user wishes to include a voice file directly recorded by the user or other audio files previously stored in a device in addition to the selectable default audio files, corresponding information should be included in the list. Further, since the control document includes questions to be shown to the user when the floating field of the template document is changed, it is possible to more conveniently inform the user of a method of changing the floating field.

The template document outputting unit 12 is for rendering and outputting the template document. The purpose of using the template document is to improve user convenience by showing to an ordinary user a structure of a multimedia document to be transmitted and allowing the user to edit only an editable portion. That is, in order to show an ordinary user a general structure of a multimedia message to be transmitted, the template document is subject to rendering and output through the template document outputting unit 12.

The control document outputting unit 13 is for rendering and outputting the control document. In order to show a user questions and objects that can be selected by the user, the control document is subject to rendering and output through the control document outputting unit 13.

The user selection information receiving unit 14 receives information selected by a user with respect to the control document output from the control document outputting unit 13. When the questions and the list of objects are displayed on a screen as the result of the rendering and outputting of the control document as described above, the user can select an object among the list of objects in response to the questions.

The user construction information receiving unit 15 receives user construction information from the user when the information selected by the user is received via the user selection information receiving unit 14, and the multimedia file information designated by the information selected by the user is the user construction information. In order to include media files directly constructed by the user in addition to the basic media files, the user should directly produce and input corresponding information so that the corresponding information can be included in the list.

The multimedia document completing unit 16 completes the template document as a multimedia document by fixing the floating field detected by the template document floating field detecting unit 11 to be an object designated by the information selected by the user among the list of selectable objects, when the information selected by the user is received through the user selection information receiving unit 14. The difference between a template document and a general multimedia document is that the template document includes a floating field that can be changed later. Accordingly, when the floating field is fixed, the template document is completed as a general multimedia document.

Figure 2:
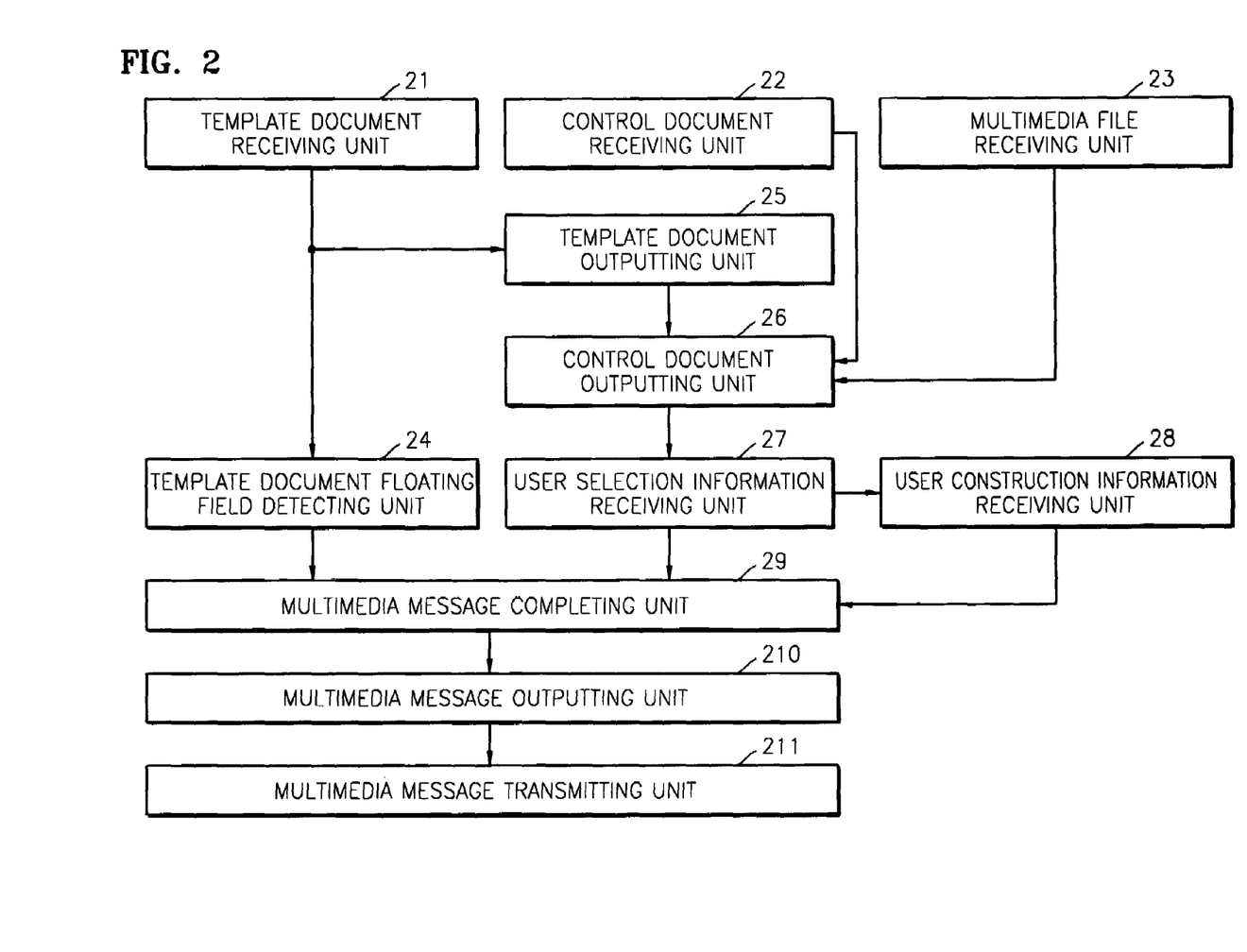
FIG. 2 is a block diagram of an apparatus for authoring multimedia messages according to the present invention.

FIG. 2 is a block diagram of an apparatus for authoring multimedia messages according to the present invention. Referring to FIG. 2, the multimedia message authoring apparatus according to the present invention includes a template document receiving unit 21, a control document receiving unit 22, a multimedia file receiving unit 23, a template document floating field detecting unit 24, a template document outputting unit 25, a control document outputting unit 26, a user selection information receiving unit 27, a user construction information receiving unit 28, a multimedia message completing unit 29, a multimedia message outputting unit 210, and a multimedia message transmitting unit 211. The multimedia message authoring apparatus shown in FIG. 2 is an application of the multimedia document authoring apparatus shown in FIG. 1 used in mobile environments and includes the template document receiving unit 21, the control document receiving unit 22, the multimedia file receiving unit 23, the multimedia message outputting unit 210, and the multimedia message transmitting unit 211 in addition to the elements of the multimedia document authoring apparatus shown in FIG. 1. These additional elements are required for transmitting and receiving multimedia messages between mobile terminals.

If a user wishes to produce and transmit a multimedia message according to the present invention, a template document of a general format of a message to be transmitted to another user, a control document designating an editable portion of the template document, and default multimedia files, such as video, audio, and image files, should be included in a database of the user's terminal, and if not, they should be downloaded from a contents provider server. Here, the template document and control document can be either independent documents or a single document incorporating the template document into the control document.

In the former case, i.e., the case where the template document and the control document are independent from one another, if the template document is not found in the database of the user's terminal when the user selects the template document, the template document receiving unit 21 receives the template document from the server. Further, in this case, if the control document is not found in the database, the control document receiving unit 22 receives the control document from the server. Likewise, if a multimedia file designated by multimedia file information is not found in the database, the multimedia file receiving unit 23 receives the multimedia file from the server. The template document floating field detecting unit 24 recognizes the control document by parsing the template document. If the template document is constructed in SMIL, a name attribute value of a meta element is used to recognize whether the control document is used and a content attribute value of the meta element is used to recognize the file name of the control document. However, in the latter case, i.e. the case where the contents of the template document are included in the control document, the process for recognizing the control document is not required because the control document has already been selected.

In the latter case, i.e., the case where the control document includes the template document, operations of the template document receiving unit 21 are not required because the template document included in the control document would be received when the control document is received. If the control document including the template document is not found in the database of the user's terminal when the user selects the template document, the control document receiving unit 22 receives the control document from the server. Likewise, if a multimedia file designated by multimedia file information is not found in the database, the multimedia file receiving unit 23 receives the multimedia file from the server. The template document floating field detecting unit 24 recognizes the template document by parsing the control document. If the control document is constructed in XML, an SMIL tag of the control document constructed in XML is used so that the template document can be recognized. However, the control document can be defined in any form insofar as the control document has the basic attributes described above.

The template document floating field detecting unit 24 detects a floating field of a template document, which is an incomplete multimedia document, including a fixed field in addition to the floating field, by parsing a control document that includes information identifying the floating field and a list of selectable objects. Here, the fixed field, which includes information on a document structure and a multimedia file, cannot be selected by the user, and the floating field, which includes information on a multimedia file, can be selected by the user.

The template document outputting unit 25 renders and outputs the template document. The control document outputting unit 26 renders and outputs the control document. The user selection information receiving unit 27 receives information selected by a user with respect to the control document output from the control document outputting unit 26. The user construction information receiving unit 28 receives user construction information from the user when the multimedia file information is the user construction information. The multimedia message completing unit 29 completes the template document as a multimedia message by fixing the floating field detected by the template document floating field detecting unit 24 to be an object designated by the information selected by the user among the list of selectable objects, when the information selected by the user is received.

The multimedia message outputting unit 210 renders and outputs the multimedia message completed by the multimedia message completing unit 29. The multimedia message transmitting unit 211 transmits the multimedia message output from the multimedia message outputting unit 210 to a terminal having a reception number input by the user when the user selects the output multimedia message and inputs the reception number.

That is, when the user selects a preview function after every editable part of the control document has been selected, the multimedia message authoring apparatus shows an edited SMIL document to the user, and when the user decides to transmit the edited SMIL document, the edited SMIL document is transmitted to the designated number.

Figure 3:
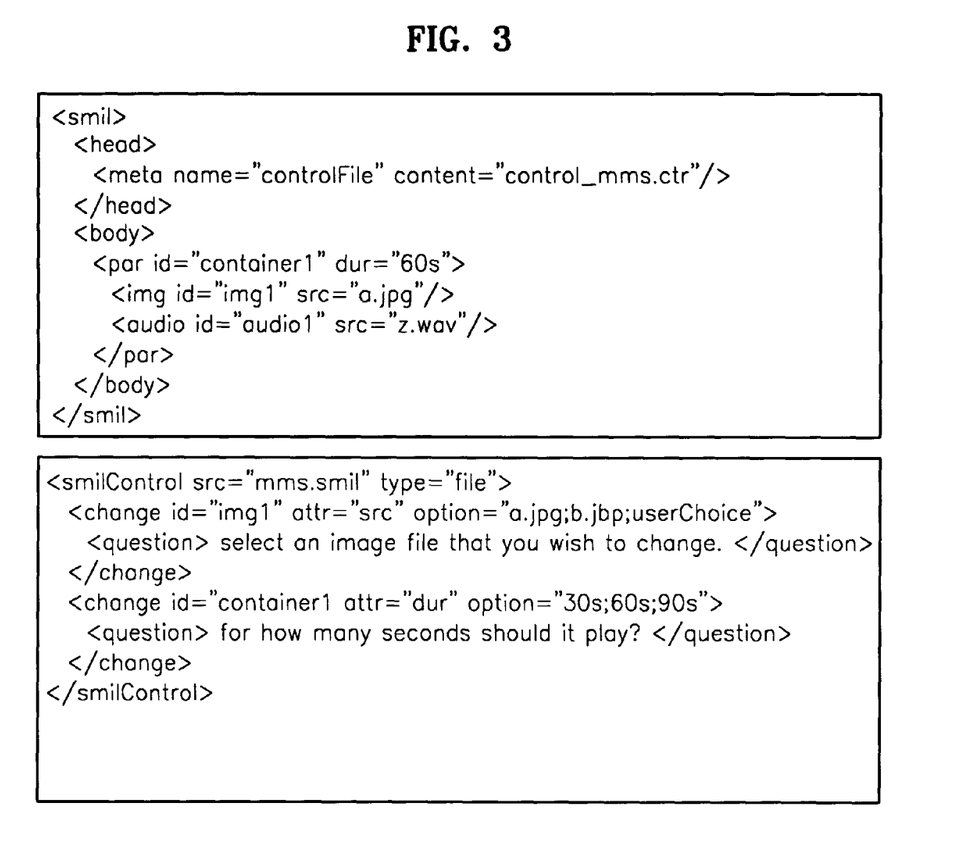
FIG. 3 shows examples of a template document and a control document, which are independent from one another and are applied to the present invention.

FIG. 3 shows examples of a template document and a control document, which are independent from one another and applied to the present invention. Specifically, FIG. 3 shows a template document named mms.smil, a control document named control_mms.ctr, and basic media files named a.jpg and b.jpg, which are downloaded from a server by a user. Here, the template document is constructed in SMIL and the control document is constructed in XML. The template document is constructed to simultaneously play the image named a.jpg and a music file named z.wav, which lasts for sixty seconds. The meta element included in the head section of the template document indicates that this template document is controlled by the control document named control_mms.ctr. The first line of the control document includes the file name of the template document controlled by the control document. The type defined as "file" in the first line of the control document indicates that the control document and the template document exist independently. If the control document incorporates the contents of the template document, the type is defined as "inline". The second line of the control document includes identification codes, an attribute, and selectable values of an element to be changed. That is, the second line of the control document in this example indicates that the "src" attribute of an image element having an identification code of "img1" of the template document will be changed. Here, the fixed field of the template document includes a predetermined element and a predetermined attribute thereof, i.e., an audio element and the "src" attribute, and the floating field of the template document includes the identification code "img1" of the image element and the value of the "src" attribute. The control document defines the image element "img1" using a change tag to indicate that the image element is the floating field and provides a list of selectable objects such as "a.jpg; b.jpg;userChoice" as "src" attribute values. At this instant, the user selectable values include a user selection value represented by "userChoice" in addition to the basic media files a.jpg and b.jpg. The multimedia document authoring apparatus displays these three values on a screen and waits for the user's selection. At this instant, a question displayed by the multimedia document authoring apparatus on a screen is the contents of a question element included in the third line of the control file. Similarly, the fifth line of the control file indicates that the element having an identification code of "container1" and an attribute of "dur" in the template document will be changed. However, since the "userChoice" attribute is not included in the option values, the user can only select any one time period among 30, 60, and 90 seconds displayed on the screen.

Figure 4:
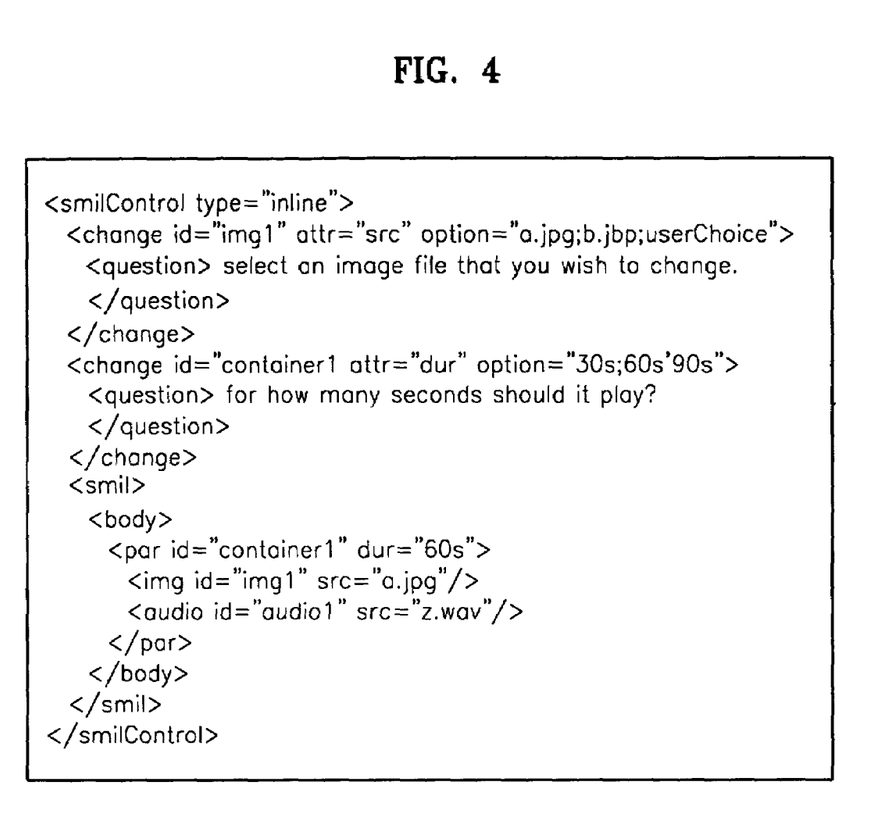
FIG. 4 shows an example of a control document including a template document, which is applied to the present invention.

FIG. 4 shows an example of a control document including a template document, which is applied to the present invention. In the example shown in FIG. 4, the type attribute value of the smilControl element is "inline". Accordingly, the previously used "src" attribute is not used any longer. In this case, changeable elements and attributes in the template document are defined using change elements, the smil element indicating the SMIL document is placed next to the change element to discriminate between the fixed field and the floating field of the template document and provide a list of selectable objects.

Figure 5:
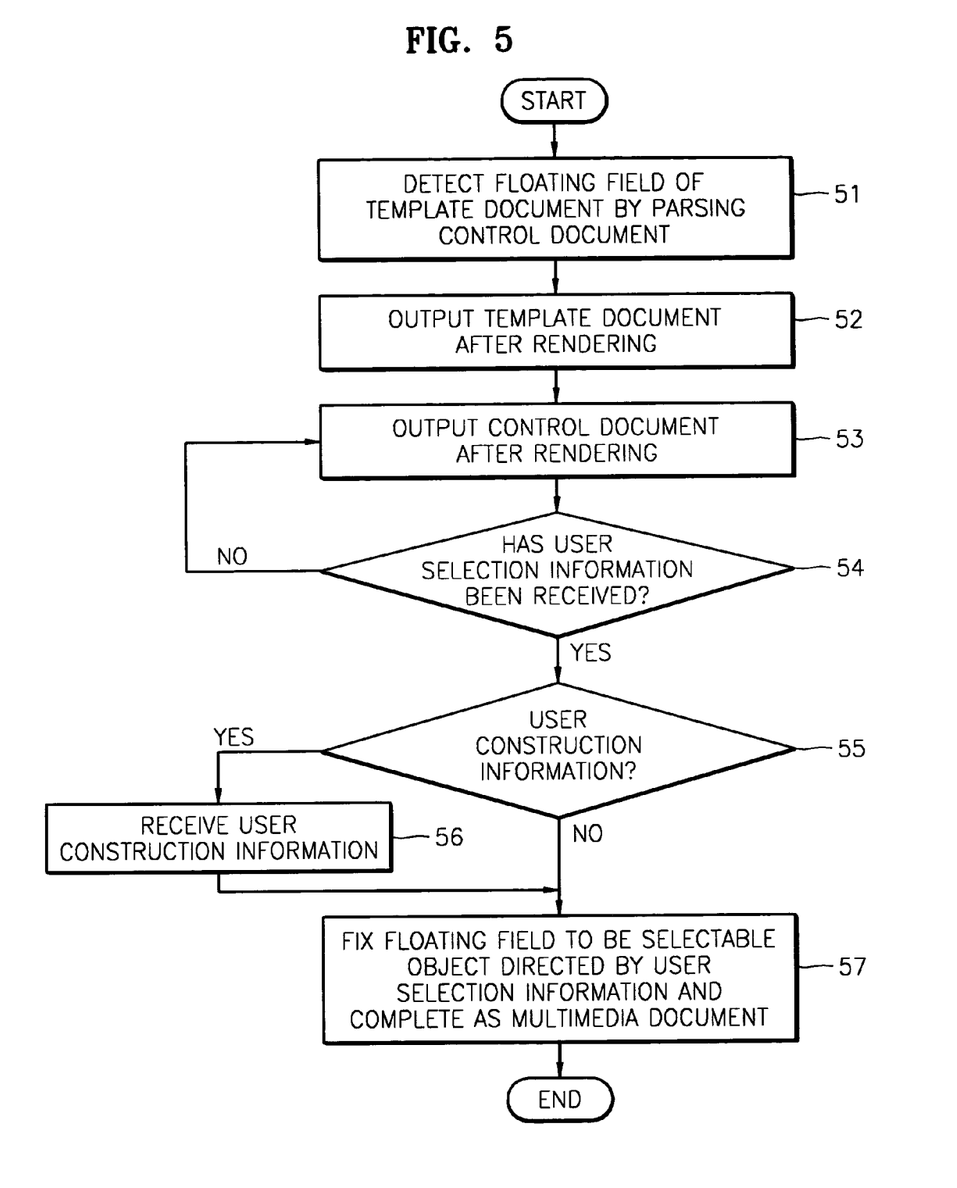
FIG. 5 is a flowchart of a method of authoring multimedia documents according to the present invention.

FIG. 5 is a flowchart of a method of authoring multimedia documents according to the present invention. First, a floating field of a template document, which is an incomplete multimedia document having a fixed field in addition to the floating field, is detected by parsing a control document that includes information for detecting the floating field and a list of selectable objects (Step 51). Here, the fixed field, which includes information on a document structure and a multimedia file, cannot be selected by the user, and the floating field, which includes information on a multimedia file, can be selected by the user. If the template document is constructed in SMIL, the document structure includes predetermined elements and predetermined attributes of the predetermined elements, and the multimedia file information includes identification codes of the predetermined elements and values of the predetermined attributes. If the control document is constructed in XML, the information for detecting the floating field includes the identification codes of the elements, and the list of selectable objects includes a list of values of predetermined attributes of the elements.

Thereafter, the template document is subject to rendering and output (Step 52). Then, the control document is subject to rendering and output (Step 53). Then, the information selected by a user is received from the user with respect to the output control document (Step 54). If information selected by the user is received in Step 54, it is determined whether the multimedia file information designated by the information selected by the user is user construction information (Step 55), and if so, the user construction information is received from the user (Step 56). If the information selected by the user is received in Step 54, the detected floating field is fixed to an object designated by the information selected by the user among the list of selectable objects and the template document is completed as a multimedia document (Step 57).

Figure 6:
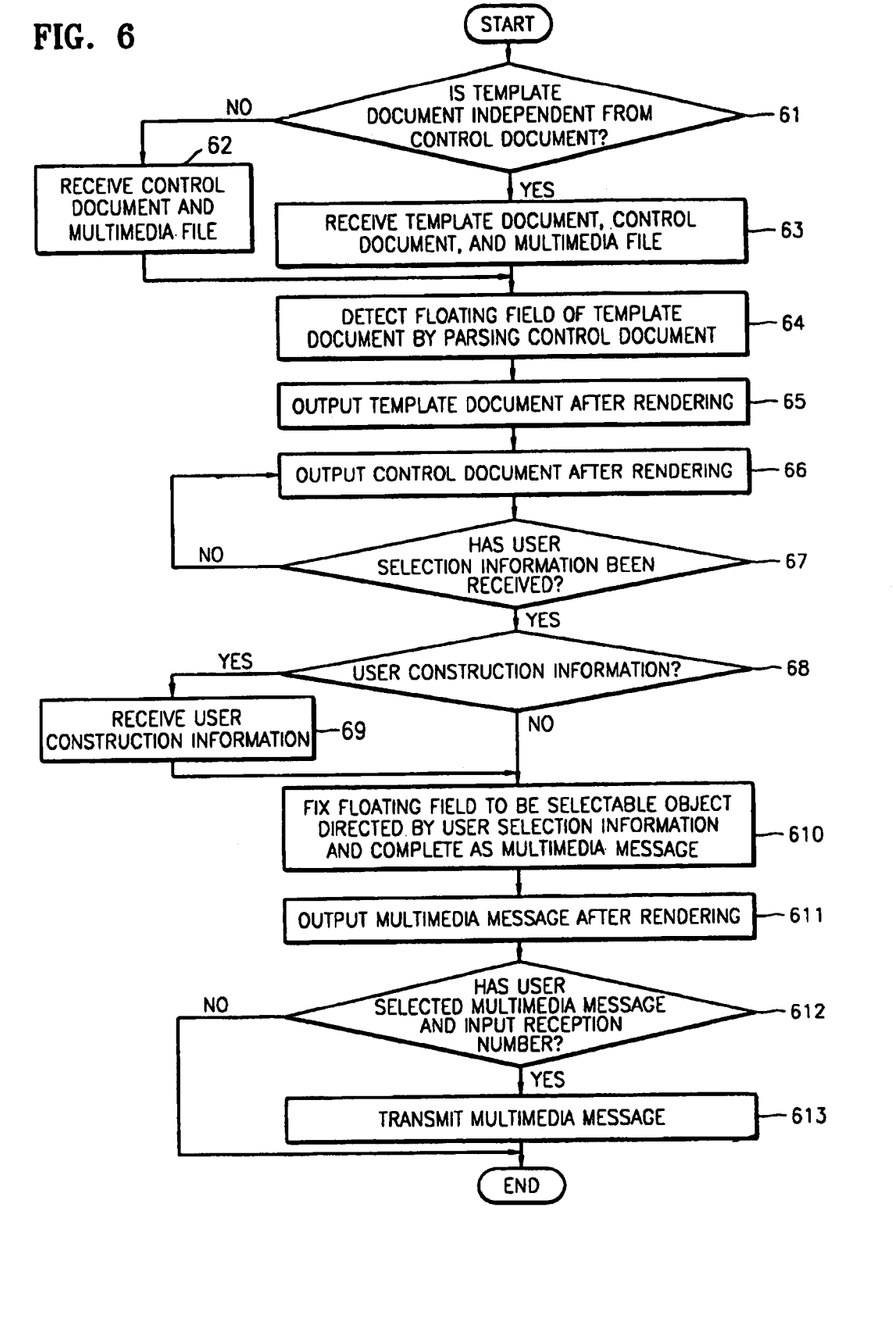
FIG. 6 is a flowchart of a method of authoring multimedia messages according to the present invention.

FIG. 6 is a flowchart of a method of authoring multimedia messages according to the present invention. First, it is determined whether a template document and a control document are independent from one another (Step 61). In a case where the template document and the control document are independent from one another and if the template document is not found in a database when the user selects the template document, the template document is received from a server. Further, if the control document is not found in the database, the control document is received from the server. Likewise, if a multimedia file designated by multimedia file information is not found in the database, the multimedia file is received from the server (Step 63). On the other hand, in the case where the control document includes the template document and if the control document including the template document is not found in the database when the user selects the template document, the control document is received from the server. Likewise, if a multimedia file designated by multimedia file information is not found in the database, the multimedia file is received from the server (Step 62).

Thereafter, a floating field of a template document, which is an incomplete multimedia document having a fixed field in addition to the floating field, is detected by parsing a control document that includes information for detecting the floating field and a list of selectable objects (Step 64). Here, the fixed field, which includes information on a document structure and a multimedia file, cannot be selected by the user, and the floating field, which includes information on a multimedia file, can be selected by the user. In a case where the template document and the control document are independent from one another, the control document is recognized by parsing the template document. If the template document is constructed in SMIL, a name attribute value of a meta element is used to recognize whether the control document is used and a content attribute value of the meta element is used to recognize the file name of the control document. However, if the control document incorporates the template document, the template document is recognized by parsing the control document. If the control document is constructed in XML, the template document is recognized using an SMIL tag of the control document constructed in XML.

Thereafter, the floating field of the template document is subject to rendering and output (Step 65). Then, the control document is subject to rendering and output (Step 66). Then, information selected by a user is received from the user with respect to the output control document (Step 67). If the information selected by the user is received in Step 67, it is determined whether the multimedia file information designated by the information selected by the user is user construction information (Step 68), and if so, the user construction information is received from the user (Step 69). If the information selected by the user is received in Step 67, the detected floating field is fixed to an object designated by the information selected by the user among the list of selectable objects and the template document is completed as a multimedia message (Step 610). Then, when the user selects a preview function, the finished multimedia message is subject to rendering and output (Step 611). Next, it is determined whether the user selects the output multimedia message and whether a reception number is received from the user (Step 612). If so, the output multimedia message is transmitted to a terminal having the input reception number (Step 613).

Figure 7:
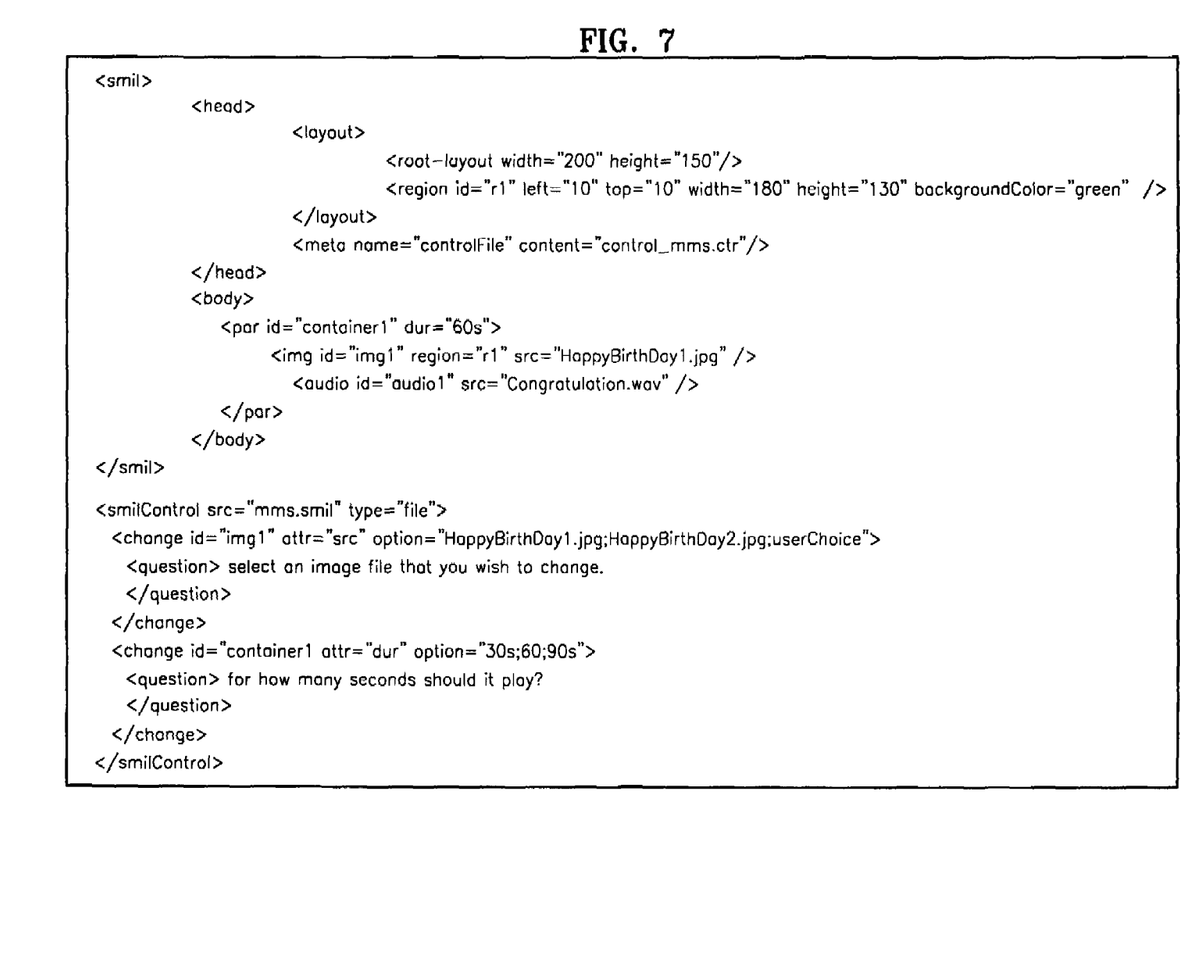
FIG. 7 shows an example of a multimedia birthday celebration message constructed according to the present invention.

FIG. 7 shows an example of a multimedia birthday celebration message constructed according to the present invention. Referring to FIG. 7, the head of the template document constructed in SMIL indicates that the size of an entire screen of a root-layout element is width=200 and height=150. Further, the region element indicates that the root-layout has a left space of 10 and a top space of 10, the background color is green, the square area has the size of width=180 and height=130, and an identification code of "r1". That is, the "r1" area is the area having spaces of 10 in four directions (i.e., left, right, top and bottom) of an entire screen. The body of the template document indicates that a birthday celebration image file, HappyBirthday1.jpg, and a birthday celebration audio file, Congratulation.wav, are selected as default media files and output for sixty seconds in the "r1" area. In the control document, since the change tag indicates "image1" and "container1" as floating fields with the options determined as option="HappyBirthday1.jpg;HappyBirthday2.jpg;userChoice" and "option="30s;60s;90s" respectively, the user can select any one of the default image files, HappyBirthday1.jpg and HappyBirthday2.jpg, provided by a contents provider or a still image directly captured by the user using, for example, a built-in camera of a mobile phone or other image files stored in the phone and produce a message. However, the reproduction time should be one of the time periods among 30s, 60s, and 90s.

The present invention can be implemented on a recording medium with a code that is readable by a computer. The recording medium that can be read by a computer may include any kind of recording devices in which data that is readable by the computer is stored. Examples of the recording medium include ROM, RAM, CD-ROM, magnetic tape, hard discs, floppy discs, flash memory, optical data storage devices, and even carrier waves, for example, transmissions over the Internet. Moreover, the recording medium may be distributed among computer systems that are interconnected through a network, and the present invention may be stored and implemented as code in the distributed system.

As described above, according to the present invention, since a template document is used, a user can produce a multimedia document through simple selection processes. Accordingly, ordinary users who do not have a sufficient knowledge on multimedia documents, particularly SMIL (Synchronized Multimedia Integration Language) documents, can conveniently produce and transmit multimedia documents, i.e., SMIL documents, and multimedia messages, particularly messages constructed in SMIL. Therefore, it is anticipated that multimedia messaging services increase in popularity. Further, a contents provider can limit the floating field, i.e., changeable attributes, to arbitrarily determine the contents to be transmitted. For example, a company logo or advertisement image can be inserted to improve advertisement effects by prohibiting changes of the inserted images.

Moreover, since the template is constructed in advance, multimedia message production time can be saved. Further, in a case where the SMIL specification is not supported, MMS service providers can prevent a user from producing multimedia messages using unavailable elements and attributes. Namely, they can provide only their own elements and attributes by providing a template made of their own available elements and attributes.

The present invention has been particularly shown and described with reference to illustrative, non-limiting embodiments thereof, and it will be understood by those of ordinary skill in the art that various changes in form and details may be made therein without departing from the spirit and scope of the present invention as defined by the appended claims.

What is claimed is:

1. An apparatus for authoring multimedia documents, comprising:

a template document floating field detecting unit that detects a floating field of a template document, which is an incomplete multimedia document having a fixed field in addition to the floating field, by parsing a control document including information identifying the floating field and a list of selectable objects;

a control document outputting unit that renders and outputs the control document;

a user selection information receiving unit that receives information selected by a user with respect to the control document output from the control document outputting unit;

a multimedia document completing unit that completes the template document as a multimedia document by fixing the floating field detected by the template document floating field detecting unit to be an object designated by the information selected by the user among the list of selectable objects when the information selected by the user is received through the user selection information receiving unit;

a template document receiving unit that receives the template document from a server if the template document is not found in a database when the user selects the template document;

a control document receiving unit that receives the control document from the server if the control document is not found in the database; and a multimedia file receiving unit that receives a multimedia file designated by the multimedia file information from the server if the multimedia file is not found in the database.

2. The apparatus for authoring multimedia documents according to claim 1, further comprising a template document outputting unit that renders and outputs the template document.

3. The apparatus for authoring multimedia documents according to claim 1, wherein the fixed field, which includes information on a document structure and at least one default multimedia file, cannot be selected by the user, and the floating field, which includes multimedia file information on at least one multimedia file, can be selected by the user.

4. The apparatus for authoring multimedia documents according to claim 3, further comprising a user construction information receiving unit that receives user construction information from the user when the information selected by the user is received through the user selection information receiving unit and the multimedia file information designated by the information selected by the user is the user construction information.

5. The apparatus for authoring multimedia documents according to claim 3, wherein if the template document is constructed in SMIL (Synchronized Multimedia Integration Language), the document structure includes one or more predetermined elements and one or more predetermined attributes of the predetermined elements and the multimedia file information includes one or more identification codes of the predetermined elements and one or more values of the predetermined attributes.

6. The apparatus for authoring multimedia documents according to claim 5, wherein if the control document is constructed in XML (Extensible Markup Language), the information for identifying the floating field includes the identification codes of the predetermined elements and the list of selectable objects is comprised of a list of values of predetermined attributes of the predetermined elements.

7. An apparatus for authoring multimedia messages, comprising:

a template document floating field detecting unit that detects a floating field of a template document, which is an incomplete multimedia document having a fixed field in addition to the floating field, by parsing a control document including information identifying the floating field and a list of selectable objects;

a control document outputting unit that renders and outputs the control document;

a user selection information receiving unit that receives information selected by a user with respect to the control document output from the control document outputting unit;

a multimedia message completing unit that completes the template document as a multimedia message by fixing the floating field detected by the template document floating field detecting unit to be an object designated by the information selected by the user among the list of selectable objects, when the information selected by the user is received through the user selection information receiving unit;

a multimedia message outputting unit that renders and outputs the multimedia message completed by the multimedia message completing unit when a preview function is selected by the user;

a multimedia message transmitting unit that transmits the output multimedia message to a terminal having a reception number when the user selects the multimedia message output from the multimedia message outputting unit and inputs the reception number;

a template document receiving unit that receives the template document from a server if the template document is not found in a database when the user selects the template document;

a control document receiving unit that receives the control document from the server if the control document is not found in the database; and a multimedia file receiving unit that receives a multimedia file designated by the multimedia file information from the server if the multimedia file is not found in the database.

8. The apparatus for authoring multimedia messages according to claim 7, further comprising a template document outputting unit that renders and outputs the template document.

9. The apparatus for authoring multimedia messages according to claim 7, wherein the fixed field, which includes information on a document structure and at least one default multimedia file, cannot be selected by the user, and the floating field, which includes multimedia file information on at least one multimedia file, can be selected by the user.

10. The apparatus for authoring multimedia messages according to claim 9 further comprising a user construction information receiving unit that receives user construction information from the user when the information selected by the user is received through the user selection information receiving unit and the multimedia file information designated by the information selected by the user is the user construction information.

11. The apparatus for authoring multimedia messages according to claim 7, wherein if the template document and the control document are independent from one another, the template document floating field detecting unit recognizes the control document by parsing the template document.

12. The apparatus for authoring multimedia messages according to claim 11, wherein if the template document is constructed in SMIL (Synchronized Multimedia Integration Language), the template document floating field detecting unit determines whether the template document is the control document using a name attribute value of a meta element and recognizes the file name of the control document using a content attribute value of the meta element.

13. The apparatus for authoring multimedia messages according to claim 7, wherein if the control document includes the template document, the template document floating field detecting unit recognizes the template document by parsing the control document.

14. The apparatus for authoring multimedia messages according to claim 13, wherein if the control document is constructed in XML (Extensible Markup Language), the template document floating field detecting unit recognizes the template document using an SMIL tag of the control document constructed in XML.

15. The apparatus for authoring multimedia messages according to claim 13, further comprising:

a control document receiving unit that receives the control document from a server if the control document is not found in a database when the user selects the template document, and a multimedia file receiving unit that receives a multimedia file designated by multimedia file information from the server if the multimedia file is not found in the database.

16. A method of authoring multimedia documents, comprising the steps of:
   (a) detecting a floating field of a template document, which is an incomplete multimedia document having a fixed field in addition to the floating field, by parsing a control document including information identifying the floating field and a list of selectable objects;
   (b) rendering and outputting the control document;
   (c) receiving information selected by a user with respect to the output control document; and
   (d) completing the template document as a multimedia document by fixing the detected floating field to be an object designated by the information selected by the user among the list of selectable objects, when the information selected by the user is received in step (c);
   further comprising before step (a), the steps of:
   receiving the template document from a server if the template document is not found in a database when the user selects the template document;
   receiving the control document from the server if the control document is not found in the database; and
   receiving a multimedia file designated by the multimedia file information from the server if the multimedia file is not found in the database.

17. The method of authoring multimedia documents according to claim 16, further comprising the step of rendering and outputting the template document, before step (b).

18. The method of authoring multimedia documents according to claim 16, wherein the fixed field, which includes information on a document structure and at least one default multimedia file, cannot be selected by the user, and the floating field, which includes multimedia file information on at least one multimedia file, can be selected by the user.

19. The method of authoring multimedia documents according to claim 18, further comprising the step of receiving user construction information from the user when the information selected by the user is received in step (c) and the multimedia file information designated by the information selected by the user is the user construction information, before step (d).

20. The method of authoring multimedia documents according to claim 18, wherein if the template document is constructed in SMIL (Synchronized Multimedia Integration Language), the document structure includes one or more predetermined elements and one or more predetermined attributes of the predetermined elements and the multimedia file information includes one or more identification codes of the predetermined elements and one or more values of the predetermined attributes.

21. The method of authoring multimedia documents according to claim 20, wherein if the control document is constructed in XML (Extensible Markup Language), the information for identifying the floating field includes the identification codes of the predetermined elements and the list of selectable objects is comprised of a list of values of predetermined attributes of the predetermined elements.

22. A method of authoring multimedia messages, comprising the step of:
   (a) detecting a floating field of a template document, which is an incomplete multimedia document having a fixed field in addition to the floating field, by parsing a control document including information identifying the floating field and a list of selectable objects;
   (b) rendering and outputting the control document;
   (c) receiving information selected by a user with respect to the output control document;
   (d) completing the template document as a multimedia message by fixing the detected floating field to be an object designated by the information selected by the user among the list of selectable objects, when the information selected by the user is received in step (c);
   (e) rendering and outputting the completed multimedia message when a preview function is selected by the user; and
   (f) transmitting the output multimedia message to a terminal having a reception number when the user selects the output multimedia message and inputs the reception number;
   further comprising before step (a), the steps of:
   receiving the template document from a server if the template document is not found in a database when the user selects the template document;
   receiving the control document from the server if the control document is not found in the database; and
   receiving a multimedia file designated by the multimedia file information from the server if the multimedia file is not found in the database.

23. The method of authoring multimedia messages according to claim 22, further comprising the step of rendering and outputting the template document, before step (b).

24. The method of authoring multimedia messages according to claim 22, wherein the fixed field, which includes information on a document structure and at least one default multimedia file, cannot be selected by the user, and the floating field, which includes multimedia file information on at least one multimedia file, can be selected by the user.

25. The method of authoring multimedia messages according to claim 24, further comprising the step of receiving user construction information from the user when the information selected by the user is received in step (c) and the multimedia file information designated by the information selected by the user is the user construction information, before step (d).

26. The method of authoring multimedia messages according to claim 22, wherein if the template document and the control document are independent from one another, step (a) includes recognizing the control document by parsing the template document.

27. The method of authoring multimedia messages according to claim 26, wherein if the template document is constructed in SMIL (Synchronized Multimedia Integration Language), step (a) includes determining whether the template document is the control document using a name attribute value of a meta element and recognizing the file name of the control document using a content attribute value of the meta element.

28. The method of authoring multimedia messages according to claim 22, wherein if the control document includes the template document, step (a) includes recognizing the template document by parsing the control document.

29. The method of authoring multimedia messages according to claim 28, wherein if the control document is constructed in XML (Extensible Markup Language), step (a) includes recognizing the template document using an SMIL tag of the control document constructed in XML.

30. A computer readable recording medium that stores a program for the computer to implement the method claimed in any one of claims 16 to 27 and 28 to 29.

* * * * *